Sept. 13, 1949.  E. H. ASHBAUGH  2,481,559
TETHERING DEVICE
Filed July 18, 1947
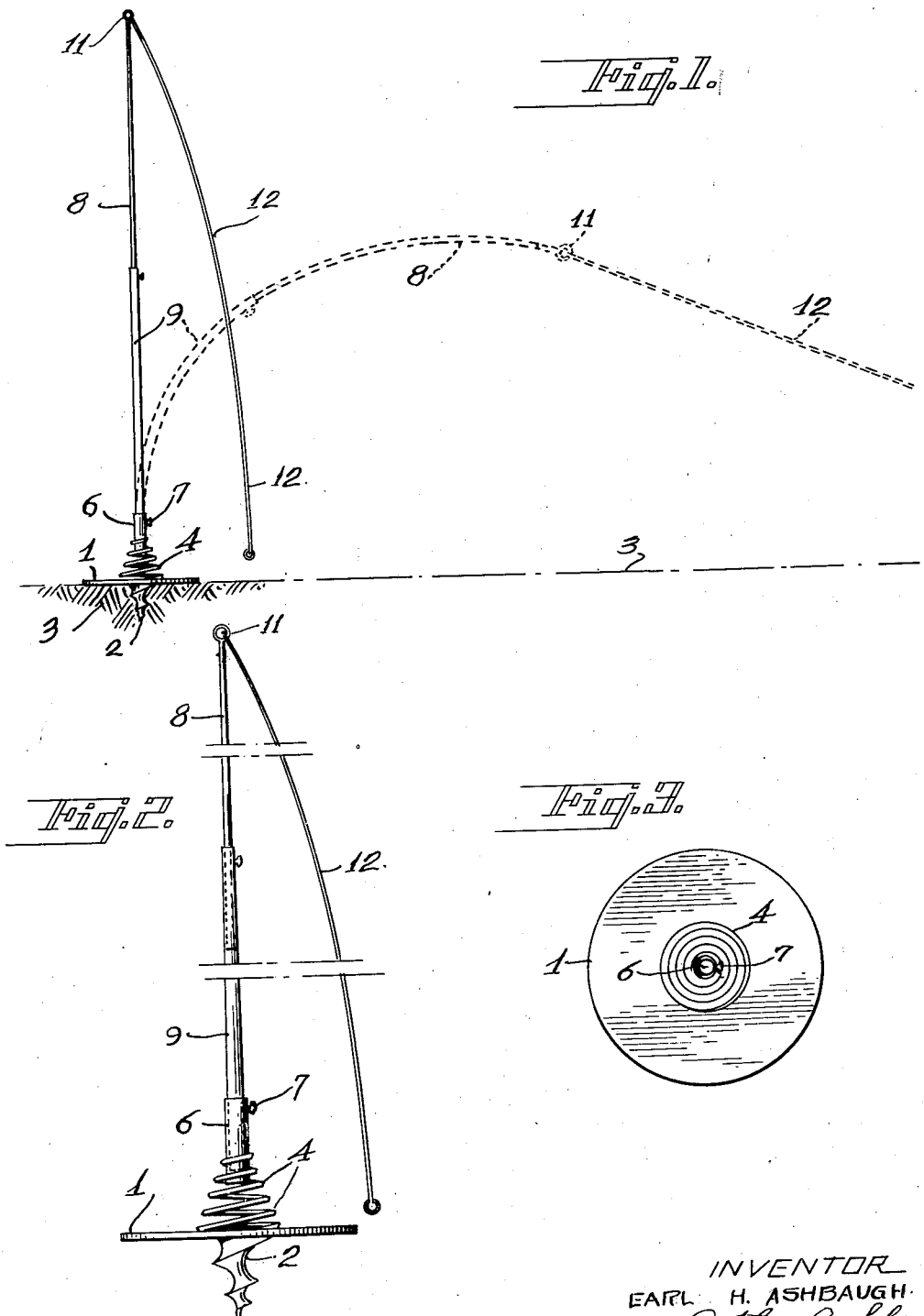
INVENTOR
EARL H. ASHBAUGH
BY Arthur L. Slee
HIS ATTORNEY Patented Sept. 13, 1949

2,481,559

UNITED STATES PATENT OFFICE 2,481,559

TETHERING DEVICE

Earl H. Ashbaugh, Petaluma, Calif.

Application July 18, 1947, Serial No. 761,842

2 Claims. (Cl. 119—121)

My invention relates to improvements in a tethering device wherein a flexible upright pole, having a leash suspended from the top thereof, operates in conjunction with an anchor plate arranged to hold said pole upright to automatically and constantly take up the slack in said leash to resiliently restrain or limit the range or area within which a child or a grazing animal attached to said leash may roam.

The primary object of the present invention is to provide a new and improved tethering line having improved means arranged to automatically and constantly take up the slack and to resiliently restrain or limit an area within which a small child, domestic pet, or grazing animal attached to said line or leash may roam.

Another object of the invention is to provide a new and improved tethering device of the character set forth having improved means for resiliently increasing a resistance upon a leash or line attached thereto to prevent an abrupt snubbing of a child, domestic pet, or grazing animal on said leash, as said child, pet or animal approaches the limit of said tethering device.

A further object is to provide a device of the type set forth having a greatly simplified and economically produced construction and a maximum efficiency.

The invention comprises the details of construction and arrangement of the several parts as disclosed in the drawings forming a part of the present application, and in which—

Fig. 1 is an elevation of the tethering device set up for use, with the line or leash thereof swung apart from the pole, as if by a breeze, for illustrative purposes;

Fig. 2 is a slightly enlarged and broken elevation of the device, removed from the ground, and showing greater detail; and Fig. 3 is a plan view of the anchor plate, with the flexible pole removed therefrom.

Referring to the drawings:

The numeral 1 is used to designate a preferably circular anchor plate having a suitable screw 2 secured to the under surface thereof and arranged to penetrate the ground 3 or earth to anchor said plate 1 thereto, as fully disclosed in Fig. 1 of the drawings.

A preferably conical spiral spring 4 is rigidly secured to the upper surface of the anchor plate 1 and has a socket 6, with a thumb-screw 7, permanently secured to the top thereof. A preferably tapered telescopic flexible pole, comprising sections 8 and 9, is mounted within the socket 6 and detachably secured therein by the thumb-screw 7 or other suitable securing device.

A suitable flexible line or leash 12 is suspended from a swivel 11 mounted upon the top of said pole, and preferably shorter than the distance from the top of the pole to the anchor plate 1 or the ground 3, the purpose of which hereinafter more fully will be set forth.

In operation: the anchor plate 1 is secured to the ground 3 by means of the screw 2. The sectional or telescopic joints 8 and 9 of the pole are mounted within the socket 6, and the leash 12 is secured to the top of said pole, or swivel 11 thereon.

A small child, household or domestic pet, or a large or small grazing animal, not shown, is suitably secured to the free end of the line or leash 12. As the leash 12 is of insufficient length to reach the ground 3 when a tethered creature is in proximate relation to the base or anchor plate 1 of said pole, it is obvious that no slack exists and therefore said leash 12 is prevented from becoming snarled or entangled with a child or animal attached to the free end thereof.

As a tethered child or animal moves away from the device, as indicated in dotted lines in Fig. 1 of the drawings, the flexibility of the pole and conical spring 4 not only will resiliently increase resistance to such movement and thereby limit or restrain the range or area within which a tethered creature may move, but such spring resistance will also automatically and constantly take up slack within said leash 12 as said child or animal returns toward the base of the device.

Such resilient increase of resistance when a subject is moving away from the base of the device also will prevent abrupt snubbing before the limit is reached and thereby prevent injury to a subject tethered thereto as well as damage or dislodgement of the device itself.

When used for tethering grazing creatures, after one area has been grazed, the device easily may be moved to and set up within a new grazing area. When used for tethering a small child or a domestic pet or the like upon a lawn, movement of said child or pet beyond a restricted area is gently and resiliently restrained without injury to such child or creature, and all slack in said leash 12 is constantly prevented so that snarling of said leash, or winding of the same around the pole, automatically is prevented.

Having described my invention, I claim—

1. A tethering device comprising a circular anchor plate; a conical screw mounted on the under side of said plate and arranged to penetrate the ground to secure said plate thereto; a vertically disposed flexible, telescopic pole flexibly connected to the upper side of said plate; and a leash shorter than said pole suspended from the top thereof.

2. A tethering device comprising a circular anchor plate; a conical screw mounted on the bottom of said plate and arranged to anchor said plate to the ground; a conical spring mounted upon the upper side of said plate; a socket secured to the top of said spring; a flexible, telescopic pole detachably mounted within said socket; and a leash shorter than said pole suspended from the top thereof.

EARL H. ASHBAUGH.

REFERENCES CITED

The following references are of record in the file of this patent:

UNITED STATES PATENTS

| Number | Name | Date |
|---|---|---|
| 417,617 | Williams | Dec. 17, 1889 |
| 429,111 | Bailey | June 3, 1890 |
| 601,952 | Day | Apr. 5, 1898 |
| 1,828,892 | Felton | Oct. 27, 1931 |
| 2,295,581 | Hyde | Sept. 15, 1942 |

FOREIGN PATENTS

| Number | Country | Date |
|---|---|---|
| 19,486 | Great Britain | 1909 |